US009785660B2

(12) United States Patent
Said et al.

(10) Patent No.: US 9,785,660 B2
(45) Date of Patent: Oct. 10, 2017

(54) DETECTION AND QUANTIFYING OF DATA REDUNDANCY IN COLUMN-ORIENTED IN-MEMORY DATABASES

(71) Applicants: Bare Said, St Leon-Rot (DE); Frank Jentsch, Muehlhausen (DE)

(72) Inventors: Bare Said, St Leon-Rot (DE); Frank Jentsch, Muehlhausen (DE)

(73) Assignee: SAP SE, Walldorf (DE)

( * ) Notice: Subject to any disclaimer, the term of this patent is extended or adjusted under 35 U.S.C. 154(b) by 336 days.

(21) Appl. No.: 14/496,715

(22) Filed: Sep. 25, 2014

(65) Prior Publication Data
US 2016/0092477 A1   Mar. 31, 2016

(51) Int. Cl.
G06F 17/30 (2006.01)

(52) U.S. Cl.
CPC .... *G06F 17/30303* (2013.01); *G06F 17/3053* (2013.01); *G06F 17/30401* (2013.01); *G06F 17/30412* (2013.01); *G06F 17/30536* (2013.01); *G06F 17/30616* (2013.01)

(58) Field of Classification Search
CPC ............... G06F 11/1092; G06F 11/108; G06F 11/0727; G06F 11/2094; G06F 11/0793; G06F 11/2089; G06F 17/30312; G06F 17/30424; G06F 17/30598; G06F 17/30339; G06F 17/30563; G06F 17/30592; G06F 17/30292; G06F 17/30595; G06F 17/30306; G06F 17/30401; G06F 17/30412; G06F 17/30536; G06F 17/3053; G06F 17/30616; G06Q 10/0631; G06Q 10/06313; G06Q 10/06375; G06Q 10/0639; G06Q 10/087; G06Q 10/0201; G06Q 10/08; G06Q 10/063114

See application file for complete search history.

(56) References Cited

U.S. PATENT DOCUMENTS

| 6,931,721 | B2 | 8/2005 | Huang |
| 7,373,354 | B2 | 5/2008 | Dittrich et al. |
| 7,809,696 | B2 | 10/2010 | Ben Harush |
| 7,895,225 | B1 | 2/2011 | Thirumalai et al. |

(Continued)

FOREIGN PATENT DOCUMENTS

| EP | 1503298 | * | 2/2005 |
| EP | 2811431 | * | 12/2014 |
| WO | WO2008/001355 | * | 1/2008 |

*Primary Examiner* — Srirama Channavajjala
(74) *Attorney, Agent, or Firm* — Fish & Richardson P.C.

(57) ABSTRACT

Methods, systems, and computer-readable storage media for quantifying a redundancy of data stored in tables of a database. In some implementations, actions include, for each primary key and table pair in a set of primary key and table pairs, determining an aggregate severity sub-score based on one or more values of the primary key in the table, the primary key being included in a set of primary keys and the table being included in a set of tables, determining an aggregate severity score for each primary key in the set of primary keys based on aggregate severity sub-scores associated with the primary key to provide a plurality of aggregate severity scores, each aggregate severity score indicating a relative redundancy of values of the primary key across all tables in the set of tables, and providing a list of aggregate severity scores and corresponding primary keys for display to a user.

20 Claims, 4 Drawing Sheets

(56) References Cited

U.S. PATENT DOCUMENTS

| | | | |
|---|---|---|---|
| 8,364,651 B2 | 1/2013 | Howey | |
| 8,442,953 B2 | 5/2013 | Lawrence et al. | |
| 8,478,749 B2* | 7/2013 | Edala | G06F 17/30864 |
| | | | 707/723 |
| 8,527,475 B1 | 9/2013 | Rammohan et al. | |
| 8,600,955 B2 | 12/2013 | Werner | |
| 8,606,758 B2 | 12/2013 | Herbst | |
| 8,666,467 B2 | 3/2014 | Lynn et al. | |
| 8,671,111 B2 | 3/2014 | Dantressangle et al. | |
| 8,719,913 B2 | 5/2014 | Ling et al. | |
| 8,762,345 B2 | 6/2014 | Miller et al. | |
| 2002/0128998 A1 | 9/2002 | Kil et al. | |
| 2004/0111410 A1* | 6/2004 | Burgoon | G06F 17/30536 |
| 2006/0004686 A1* | 1/2006 | Molnar | G06F 17/30297 |
| 2006/0074858 A1* | 4/2006 | Etzold | G06F 17/30451 |
| 2008/0005106 A1* | 1/2008 | Schumacher | G06F 17/30489 |
| 2008/0033912 A1* | 2/2008 | Bossman | G06F 17/30306 |
| 2008/0059492 A1 | 3/2008 | Tarin | |
| 2009/0172035 A1* | 7/2009 | Lessing | G06F 17/30595 |
| 2009/0204590 A1* | 8/2009 | Yaskin | G06F 17/30011 |
| 2009/0254532 A1* | 10/2009 | Yang | G06F 17/30315 |
| 2010/0131568 A1* | 5/2010 | Weinberg | G06F 17/30607 |
| | | | 707/803 |
| 2010/0131570 A1* | 5/2010 | Weinberg | G06F 17/30607 |
| | | | 707/803 |
| 2011/0208748 A1* | 8/2011 | Chaudhuri | G06F 17/30306 |
| | | | 707/748 |
| 2011/0231410 A1* | 9/2011 | Hahn | G06F 17/30528 |
| | | | 707/748 |
| 2011/0289091 A1* | 11/2011 | Collins | G06Q 10/10 |
| | | | 707/741 |
| 2011/0320400 A1* | 12/2011 | Namini | G06F 17/30327 |
| | | | 707/610 |
| 2012/0011133 A1 | 1/2012 | Faerber et al. | |
| 2012/0221582 A1* | 8/2012 | Boross | G06F 17/30572 |
| | | | 707/752 |
| 2012/0278249 A1* | 11/2012 | Duggal | G06Q 40/08 |
| | | | 705/325 |
| 2013/0151491 A1* | 6/2013 | Gislason | G06F 17/30339 |
| | | | 707/696 |
| 2013/0166554 A1* | 6/2013 | Yoon | G06F 17/30312 |
| | | | 707/737 |
| 2014/0114906 A1 | 4/2014 | Hegde et al. | |

* cited by examiner

DETECTION AND QUANTIFYING OF DATA REDUNDANCY IN COLUMN-ORIENTED IN-MEMORY DATABASES

BACKGROUND

One challenge of enterprise systems, e.g., an enterprise resource planning (ERP) system, includes avoiding data redundancy. For example, well-designed enterprise systems follow strict data modeling rules in an effort to achieve a redundancy-free data model. Although such modeling rules are available and often strictly followed, data redundancy still occurs. For example, business processes often rely on similar data. Consequently, the more comprehensive an enterprise system is, the more data redundancy it will contain. Data redundancy can become a bigger issue when distributed business systems have to be integrated into a single enterprise system. This results from the variety of data structures and models, as well as the variety of business processes.

Detection of data redundancy can be achieved by comparing data structures. However, this approach has disadvantages. For example, finding similar data structures does not definitively indicate redundancy. This is, for example, the case when reusable structures such as address are used. In an example business context, the address structure (first name, surname, city, etc.) is used in both business objects: customer and supplier. In case customers and suppliers are disjoint, there will be no redundancy in address data. As another example, with data structure comparison, it is not possible to determine the severity of data redundancy. For example, severity of data redundancy can be calculated based on how much overlap exists in the database content. As another example, the same data can be sorted within different attribute-names or labels.

SUMMARY

Implementations of the present disclosure include computer-implemented methods for determining a severity of data redundancy. More particularly, implementations of the present disclosure are directed to indicating a severity of data redundancy for respective primary keys. In this manner, a data redundancy elimination operation can be performed based on primary keys that reflect a relatively high degree of data redundancy.

In some implementations, actions include, for each primary key and table pair in a set of primary key and table pairs, determining an aggregate severity sub-score based on one or more values of the primary key in the table, the primary key being included in a set of primary keys and the table being included in a set of tables, determining an aggregate severity score for each primary key in the set of primary keys based on aggregate severity sub-scores associated with the primary key to provide a plurality of aggregate severity scores, each aggregate severity score indicating a relative redundancy of values of the primary key across all tables in the set of tables, and providing a list of aggregate severity scores and corresponding primary keys for display to a user. Other implementations of this aspect include corresponding systems, apparatus, and computer programs, configured to perform the actions of the methods, encoded on computer storage devices.

These and other implementations can each optionally include one or more of the following features: determining an aggregate severity sub-score based on one or more values of the primary key in the table for a primary key and table pair includes: determining a plurality of value severity sub-scores, each value severity sub-score being determined based on a number of occurrences of a value of the primary key, and an attribute weight, determining a value severity score based on the plurality of value severity sub-scores, and determining the aggregate severity sub-score based on a plurality of value severity scores, the value severity score being included in the plurality of value severity scores; the aggregate severity sub-score is further based on a number of entries of the table of the primary key and table pair; actions further include obtaining a set of associated attributes for each primary key in the set of primary keys based on a chain of tables in the set of tables, the chain of tables including two or more tables; actions further include, for each associated attribute in the set of associated attributes, determining an attribute weight based on a degree of indirection in the chain of tables; the list of aggregate severity scores is provided as a ranked list of scores based on respective values of the plurality of aggregate severity scores; and actions further include receiving, by the one or more processors, user input based on the list of aggregate severity scores, the user input indicating a command to execute an operation to reduce redundancy associated with a primary key of the set of primary keys; and performing the operation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to detecting data redundancy in enterprise systems, and automatically calculating a severity of the data redundancy based on data values. As described in further detail herein, implementations of the present disclosure leverage the power of column-oriented in-memory databases. In some implementations, primary key handling is performed to provide a set of weighted attributes for each primary key in a set of primary keys. After the primary key handling is performed, one or more redundancy detection runs are performed to provide an aggregate severity score for a respective primary key. In some examples, the aggregate severity score indicates a degree of data redundancy for a primary key and a particular table. In some implementations, redundancy elimination can be performed based on respective aggregate severity scores. For example, a primary key having the highest aggregate severity score can be one focus of redundancy elimination operations.

Figure 1:
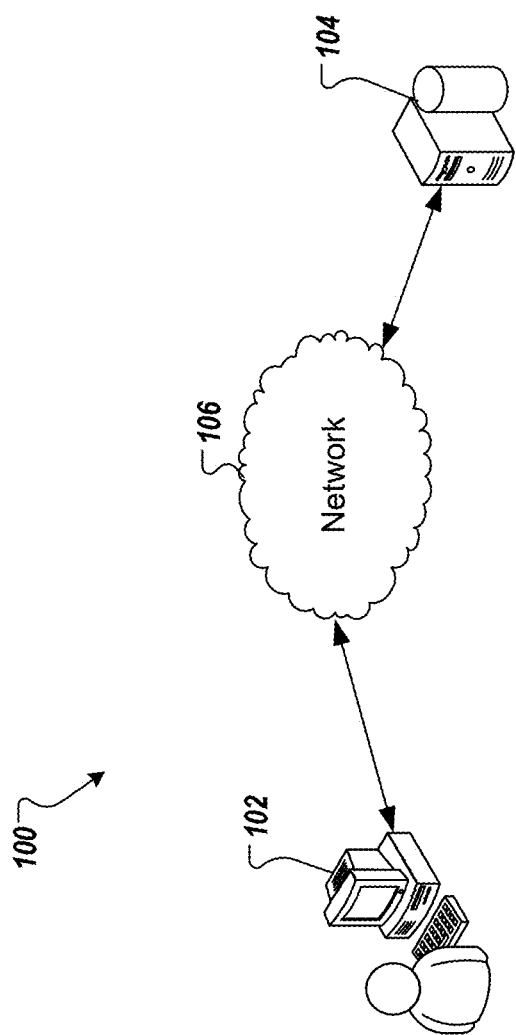
FIG. 1 depicts an example high-level architecture in accordance with implementations of the present disclosure.

FIG. 1 depicts an example architecture 100 in accordance with implementations of the present disclosure. The example architecture 100 of FIG. 1 includes a computing device 102, a server device 104 and a network 106. In the depicted example, a user interacts with the computing device 102. For example, the user can be an administrator that uses the computing device 102 to interact with the server device 104 to evaluate and/or eliminate data redundancy in accordance with implementations of the present disclosure.

In some examples, the computing device 102 can communicate with the server device 104 over one or more networks, e.g. the network 106. In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the server device 104 includes at least one server and at least one data store. In the example of FIG. 1, the server device 104 is intended to represent various forms of servers including, but not limited to a web server, an application server, a proxy server, a network server, and/or a server pool. In general, server systems accept requests for application services and provides such services to any number of client devices, e.g., the computing device 102, over the network 106.

In some implementations, one or more data stores of the server device 104 store one or more databases. In some examples, a database can be provided as an in-memory database system. In some examples, an in-memory database is a database management system that uses main memory for data storage. In some examples, main memory includes random access memory (RAM) that communicates with one or more processors, e.g., central processing units (CPUs), over a memory bus. An in-memory database system can be contrasted with database management systems that employ a disk storage mechanism. In some examples, in-memory database systems are faster than disk storage databases, because internal optimization algorithms can be simpler and execute fewer CPU instructions, e.g., require reduced CPU consumption. In some examples, accessing data in an in-memory database system eliminates seek time when querying the data, which provides faster and more predictable performance than disk-storage databases. In some examples, an in-memory database can be provided as a column-oriented in-memory database, in which data tables are stored as sections of columns of data (rather than as rows of data).

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server device 104 can host and execute an integrated enterprise system. For example, two or more distributed enterprise systems can be integrated to provide a single enterprise system. Example enterprise systems that can be integrated can include an enterprise resource planning (ERP) system, a customer relationship management (CRM) system, and a supplier relationship management (ERM) system. For example, multiple enterprise systems can be integrated, such that the underlying data of each system is stored in a single database, e.g., in-memory database. In some examples, integration of distributed enterprise systems can result in data redundancy, which can lead to inefficiencies, e.g., more memory is needed to store redundant data. For example, integration can result in over 40,000 database tables encompassing over 300,000 data structures being stored in memory. As described in further detail herein, implementations of the present disclosure can be executed, e.g., in the example architecture 100 of FIG. 1, to identify and quantify data redundancy in an integrated enterprise system.

Implementations of the present disclosure are directed to detecting and quantifying data redundancy in enterprise systems by automatically calculating a severity of the data redundancy based on data values. As described in further detail herein, implementations of the present disclosure leverage the power of column-oriented in-memory databases. In accordance with implementations of the present disclosure, data redundancy is detected by value-based evaluation of database content. In some examples, the primary key structure or type of each data table is determined and marked as starting point of a redundancy detection run.

Implementations of the present disclosure will be described in further detail herein with reference to an example context. The example context includes a business context. Although implementations are described in further detail herein with reference to the example context, it is contemplated that implementations of the present disclosure are applicable in any appropriate context, e.g., a healthcare context.

In the example context, an enterprise system can store and access data based on a data object, e.g., a business object. Example business objects can include a Sales Order object, a Customer object, a Supplier object, an Address object, and the like. In some examples, each business object defines a data structure including one or more attributes of the respective object, a data value being provided for each attribute. In some examples, each business object includes a primary key. For example, metadata of the business object can identify a particular attribute as the primary key for the particular object. In some examples, data for the business object is stored in one or more database tables. For example, when a business object is accessed, data can be retrieved from a database table (table) to populate the business object.

In some implementations, a business object references other business objects. For example, a Sales Order object can reference a Customer object, e.g., the customer that made a purchase captured in the sales order. Consequently, a chain of business objects can be provided. In some examples, the chain of business objects can be provided based on a primary key and one or more foreign keys. In some examples, the primary key is provided as an attribute that uniquely identifies each record in a respective table, e.g., the table storing data values for a respective business object. In some examples, a foreign key is provided as an attribute of a table that uniquely identifies a row of another table.

In some implementations, a chain of tables can be provided based on a chain of business objects. For example, a Sales Order object can be considered and can include a primary key [Sales Order ID]. Data for the Sales Order object can be stored in a Sales Order table. For example, the [Sales Order ID] attribute is provided as the primary key of the Sales Order table, because values thereof are unique for each sales order stored of a Sales Order table. The Sales Order object can reference another object, such as a Customer object using a foreign key. An example foreign key can include [Customer ID]. Data for the Customer object can be stored in a Customer table. The Customer object can reference another object, such as an Address object using a foreign key. An example foreign key can include [Address ID]. Data for the Address object can be stored in an Address table.

In some implementations, a primary key handling is performed to determine a set of primary keys from a set of tables, e.g., that includes n tables, where n ≥1, and a set of attributes associated with each primary key (P) in the set of primary keys. That is, for a given set of tables, all primary keys are identified. In some examples, one primary key is provided for each table in the set of tables. In some examples, the set of tables can include all tables of the integrated enterprise system being considered. In some examples, the set of tables can include less than all tables of the integrated enterprise system being considered. For example, an administrator can determine which tables are to be included in the set of tables.

In accordance with implementations of the present disclosure, for each primary key, a set of weighted-attributes is determined. In some examples, each attribute (a) in each set of attributes is weighted to provide the set of weighted attributes for the respective primary key. In some implementations, an attribute is weighted based on an association grade (g) with respect to the primary key to provide a respective attribute weight ($a_w$). In some examples, an association grade indicates a degree of distance between a primary table, e.g., the table having the primary key, and the table having the attribute. Accordingly, an attribute of the primary table, e.g., in the same table as the primary key, is assigned an association grade of one (1). As another example, an attribute that is provided in the table of a directly referenced foreign key is assigned an association grade of two (2).

Figure 2:
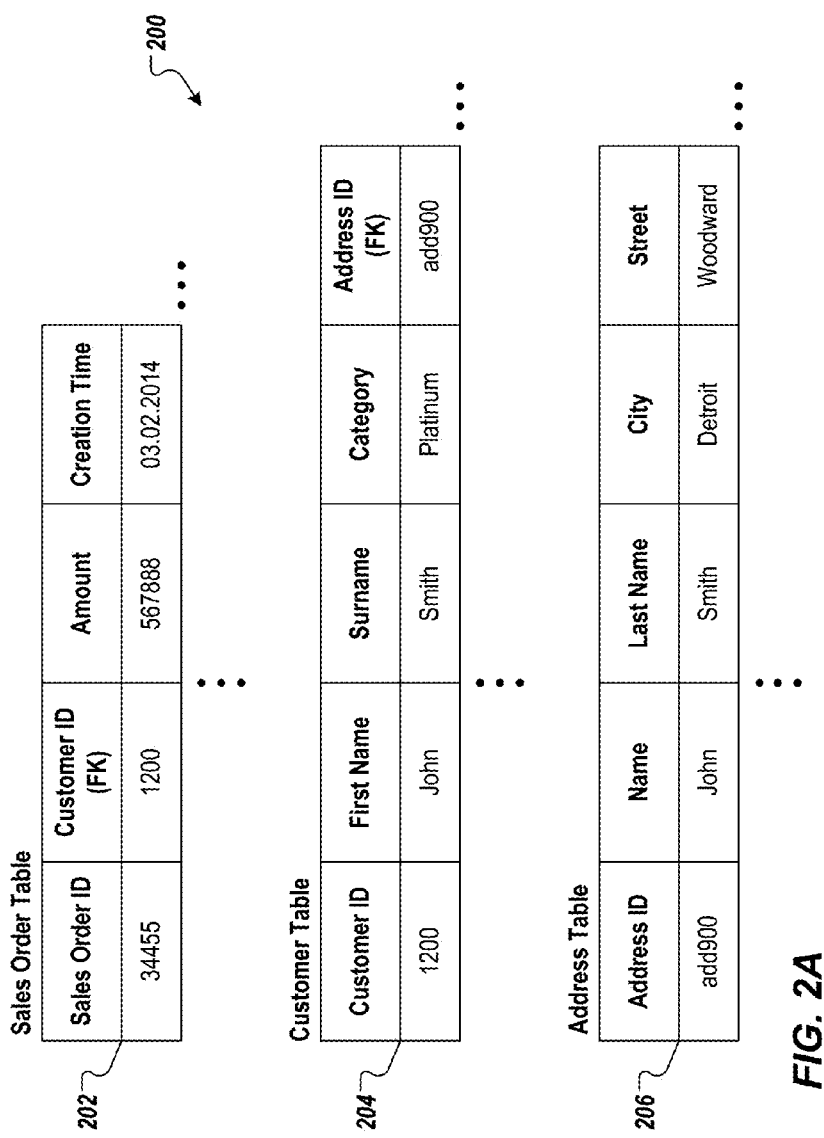
FIG. 2A depicts an example chain of tables and association grades in accordance with implementations of the present disclosure.
FIG. 2B depicts example association grades based on the example chain of tables of FIG. 2A.

FIG. 2A depicts an example chain of tables 200 and association grades in accordance with implementations of the present disclosure. The example chain of tables 200 reflects the example chain described above, e.g., Sales Order table→Customer table→Address table. Accordingly, the example of FIG. 2A includes a Sales Order table 202, a Customer table 204 and an Address table 206. In the depicted example, the Sales Order table 202 includes the example attributes [Sales Order ID], [Customer ID], [Amount], and [Creation Time]. Although not depicted, other example attributes of the Sales Order table 202 can include [Date Shipped], [Customer Name] and [Customer Phone Number]. In the depicted example, the attribute [Sales Order ID] is provided as the primary key of the Sales Order table 202, and the attribute [Customer ID] is provided as a foreign key (FK). That is, the attribute [Customer ID] references the Customer table 204.

In the depicted example, the Customer table 204 includes the example attributes [Customer ID], [First Name], [Surname], [Category] and [Address ID]. Although not depicted, the Customer table 204 can include other attributes. In the depicted example, the attribute [Customer ID] is provided as the primary key of the Customer table 204, and the attribute [Address ID] is provided as a foreign key. That is, the attribute [Address ID] references the Address table 206.

In the depicted example, the Address table 206 includes the example attributes [Address ID], [Name], [Last Name], [City] and [Street]. Although not depicted, the Address table 206 can include other attributes. In the depicted example, the attribute [Address ID] is provided as the primary key of the Address table 206.

Example determination of a set of primary keys and respective sets of associated attributes and assigned association grades are described in further detail with reference to the example of FIG. 2A. As introduced above, for a given set of tables, e.g., the tables 202, 204, 206 of FIG. 2a, a set of primary keys is determined, and a set of attributes associated with each primary key in the set of primary keys is determined. In the example of FIG. 2A, the set of primary keys can include the primary key [Sales order ID], the primary key [Customer ID], and the primary key [Address ID]. In the example of FIG. 2A, the set of associated attributes for the primary key [Sales Order ID] includes the attributes [Customer ID], [Amount] and [Creation Time] from the Sales Order table 202, [Customer ID], [First Name], [Surname], [Category] and [Address ID] from the Customer table 204, because [Customer ID] is also a foreign key from the Sales Order table 202 to the Customer table 204, and the attributes [Address ID], [Name], [Last Name], [City] and [Street] from the Address table 206, because [Address ID] is also a foreign key from the Customer table 204 to the Address table 206.

As also introduced above, an association grade is assigned to each associated attribute in the set of associated attributes for a respective primary key. The association grade indicates how many indirections are needed to reach an associated attribute. In some examples, the weighting can be flexible, e.g., adjusted by an administrator. In some examples, the association grade increases linearly with the length of foreign key references in a chain of table. FIG. 2B depicts example association grades based on the example chain of tables 200 of FIG. 2A.

For each attribute in a set of attributes, an attribute weight (aw) is provided. The weighting of associated attributes is association grade dependent. An example relationship for determining an attribute weight is provided as:

$$aw=1/g$$

The attribute weight based on the example relationship above, will weight associated attributes provided in the primary table higher than indirectly referenced attributes. The longer a key references chain for an associated attribute is, the smaller its weight. The rationale for this weighting is that there is a linear correlation between association grade and number of joins needed to access associated attributes located in their primary table. For example, an associated attribute provided in the primary table can be easily joined with one single database join operation and does not need to be redundantly stored. However, an associated attribute provided in a table further down the chain of tables requires multiple join operations, which can be expensive, e.g., in terms of computational power and/or memory.

In some implementations, storage-aware weighting can be provided. In some examples, storage-aware weighting considers the storage need per attribute. An example relationship for determining a storage-aware attribute weight ($aw_s$) is provided as:

$$aw_s = [1/g]s$$

where s is the storage need of the respective attribute. For example, the value s can be provided as the number of bytes required to store the respective attribute in memory. In some examples, the storage need may be relevant when data redundancy elimination is motivated by memory saving reasons. In some examples, the storage need may be less relevant when guaranteeing data consistency is of primary concern.

Referring to FIGS. 2A and 2B an example set of weighted attributes (attribute, weight) for the primary key [Sales Order ID] (not considering storage need) includes:
[Customer ID], 1
[Amount], 1
[Creation Time], 1
[Customer ID], 0.5
[First Name], 0.5
[Surname], 0.5
[Category], 0.5
[Address ID], 0.5
[Address ID], 0.33
[Name], 0.33
[Last Name], 0.33
[City], 0.33
[Street], 0.33

An example set of weighted attributes (attribute, weight) for the primary key [Customer ID] (not considering storage need) includes:
[First Name], 1
[Surname], 1
[Category], 1
[Address ID], 1
[Address ID], 0.5
[Name], 0.5
[Last Name], 0.5
[City], 0.5
[Street], 0.5

An example set of weighted attributes (attribute, weight) for the primary key [Address ID] (not considering storage need) includes:
[Name], 1
[Last Name], 1
[City], 1
[Street], 1

It is appreciated that the examples described herein with reference to FIGS. 2A and 2B are simplified examples for purposes of discussion. More particularly, implementations of the present disclosure are applicable to chains of tables having hundreds to thousands of tables, primary keys, foreign keys and attributes.

As described in further detail herein, implementations of the present disclosure use a column-oriented in-memory database, which enables the content comparison to be done easily and without requiring full table scans. In a column-oriented in-memory database, it is a relatively cheap operation, e.g., in terms of processing power and/or memory, to perform a query, e.g., [if and how many times a value occurs in a column]. Further, the column-oriented in-memory database enables the content comparison to be done in parallel, column-wise.

In accordance with implementations of the present disclosure, after the primary key handling is performed, a redundancy detection and severity calculation run ("detection run") is triggered for each primary key. In some examples, a detection run includes all values of the primary key and all determined associated attributes. For each occurrence of a primary key value in a subject table, the values of the associated attributes are determined. The more attributes values that are found, the more redundancy the subject table contains. Attributes with hits are included in the severity calculation with the corresponding attribute weight. In some implementations, the calculated redundancy-severities for all pairs {primary key (P), table (T)} are presented in a ranked list. In some examples, pairs with the highest scores are first candidates that have to be considered in a redundancy elimination activity.

In further detail, a redundancy detection run for a primary key involves all primary key values of the primary key and all tables of the set of tables. In a first loop, a detection run is performed for the primary key and a particular table in the set of tables to provide a value-based severity score ($V_s$) for the particular primary key and value pair, e.g., $\{P, V_s\}$. In some examples, a set of relevant attributes, e.g., $\{ra_1, \ldots, ra_n\}$ is determined and includes one or more attributes that are included in the set of associated attributes of the primary key and that are attributes provided in the subject table. The set of relevant attributes also includes attribute weights, e.g., $\{aw_1, \ldots, aw_j\}$ for the respective attributes, which are provided as described herein.

In some implementations, for each associated attribute the value that corresponds to the primary key value is determined and is compared to columns of the subject table to determine if the value is present in the column and to determine how many times the value occurs in the respective column, e.g., the number of occurrences m, where m ≥0. For each relevant attribute, the number of occurrences (m) is multiplied by the respective attribute weight. Accordingly, a value severity sub-score (v) can be provided for a respective relevant attribute, where the value severity sub-score is the product of the number of occurrences of the value of the respective relevant attribute and the attribute weight of the respective relevant attribute. An example relationship for the value-based sub-score can be provided as:

$$v_{i,g} = (aw_i)(m); \text{ where } i=1,\ldots,k, \text{ and } g=1,\ldots,l$$

A value severity score for the primary key and respective value ($r_g$) is provided as a sum of the value severity sub-scores. An example relationship for determining the value severity score for a primary key and respective value can be provided as:

$$V_{i,g} = \Sigma_{i=1}^{l}(v_{i,g})$$

After all values in the set of values have been considered, an aggregate severity sub-score ($V_{AGG,i,j}$) is determined for the respective primary key and table pair $\{P_i, T_j\}$. An example relationship for determining a severity score for a particular primary key and table pair is provided as:

$$V_{AGG,i,j} = \frac{\sum_{g=1}^{l} V_{i,g}}{L_j}$$

where $L_j$ is the number of entries in the respective table $T_j$. In this manner, a severity of redundancy reflects the overall amount of data in the respective table.

This process is repeated for each primary key in the set of primary keys and for each table in the set of tables. In this manner, a plurality of primary key (P) and aggregate severity score ($V_{AGG}$) pairs $\{P_i, V_{AGG,i}\}$ are provided for each table $T_j$. Once all primary keys and tables have been considered, an aggregate severity score ($V_{AGG}$) is determined for each primary key. In some examples, the aggregate severity score is determined as the sum of aggregate severity sub-scores across all tables in the set of tables for a respective primary key. An example relationship can be provided as:

$$V_{AGG,i} = \sum_{j=1}^{p} V_{AGG,i,j}$$

Accordingly, a set of aggregate severity scores $\{V_{AGG,1}, \ldots, V_{AGG,k}\}$ is provided, with each aggregate severity score corresponding to a respective primary key in the set of primary keys $\{P_1, \ldots, P_k\}$.

In some implementations, and as described herein, one or more operations can be performed to reduce a redundancy. For example, aggregate severity scores in the set of aggregate severity scores can indicate one or more primary keys, in view of which one or more redundancy reduction operations can be performed. In general, a high aggregate severity score indicates a relatively high level of redundancy across the tables in the set of tables. Consequently, one or more redundancy reduction operations can be performed to reduce data redundancy associated with a primary key having a relatively high aggregate redundancy score. In some examples, the detection run can be performed again, after the one or more redundancy reduction operations are performed, to evaluate an improvement to (reduction of) a data redundancy.

For example, a first detection run can be performed, and a first aggregate redundancy score for a primary key can be provided. In some examples, the first aggregate redundancy score indicates a relatively high level of data redundancy associated with the primary key. Consequently, one or more redundancy reduction operations can be performed. After the one or more redundancy reduction operations are performed, a second detection run can be performed, and a second aggregate redundancy score for the primary key can be provided. In some examples, the second aggregate redundancy score is less than the first aggregate redundancy score, which indicates that the one or more redundancy reduction operations were successful in reducing the data redundancy associated with the primary key.

Figure 3:
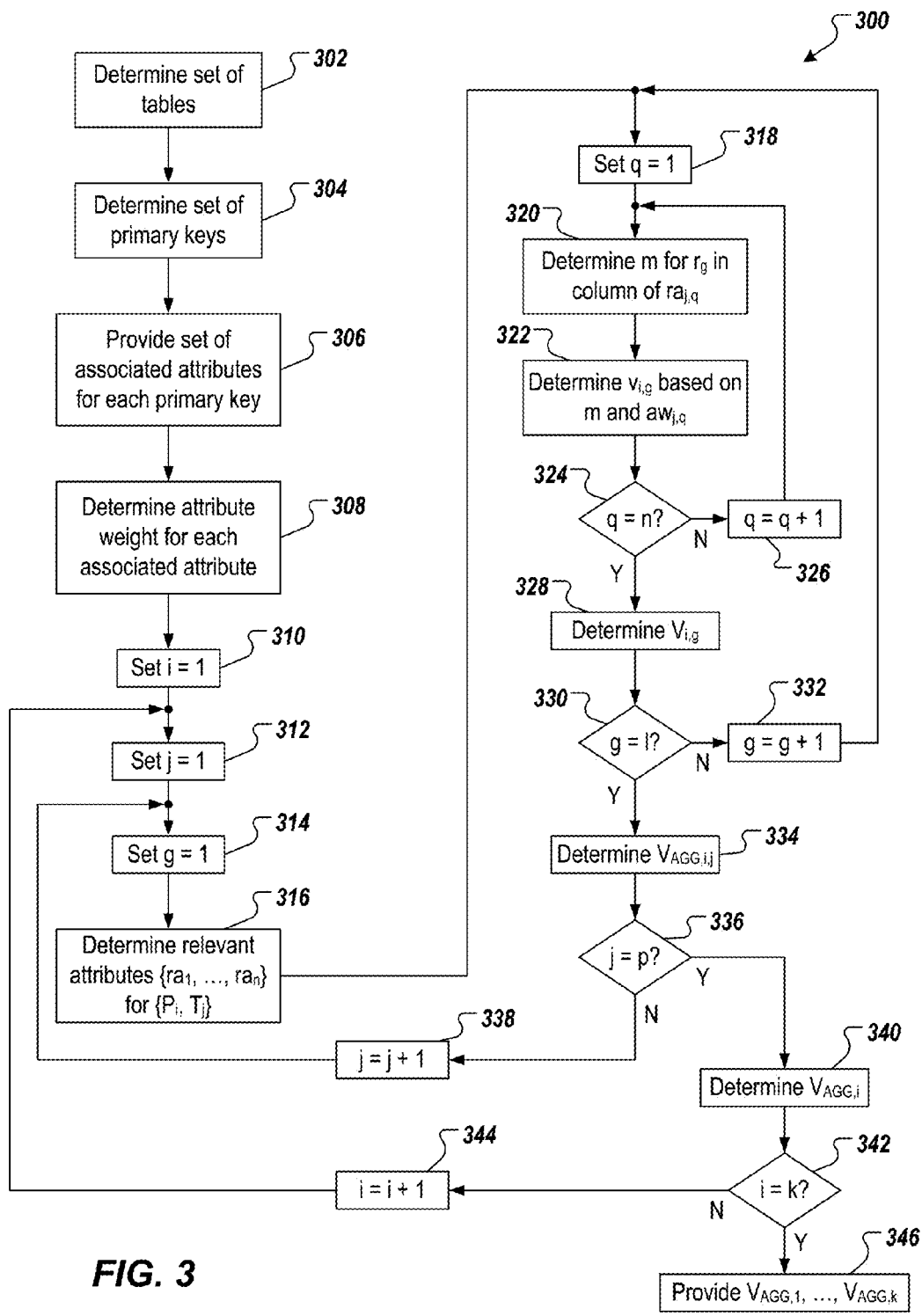
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices, and can be performed to quantify and reduce data redundancy.

A set of tables is determined (302). For example, the set of tables includes $\{T_1, \ldots, T_p\}$. In some examples, the set of tables includes all tables accessed by an enterprise system, e.g., an integrated enterprise system. In some examples, the set of tables includes less than all tables accessed by an enterprise system, e.g., an integrated enterprise system. For example, an administrator can define, which tables are to be included in the set of tables. A set of primary keys is determined (304). For example, the set of primary keys includes $\{P_1, \ldots, P_k\}$. In some examples, each table in the set of tables includes a primary key, e.g., k=p. In some examples, metadata associated with a table indicates the primary key of the table. In the example context, primary keys in the set of primary keys are primary keys that correlate with business entities, e.g., Sales Order, Customer, and can be defined in the header tables of respective business entities.

A set of associated attributes is provided for each primary key (306). For example, the set of associated attributes includes $\{a_1, \ldots, a_f\}$. In some examples, and as described herein, a key reference chain is determined for a primary key based on one or more foreign keys that the table of the primary key, e.g., primary table, directly or indirectly references, and attributes of the referenced tables are included in the set of associated attributes. An attribute weight is determined for each associated attribute (308). For example, a set of attribute weights is provided and includes $\{aw_1, \ldots, aw_f\}$. In some examples, and as described herein, each attribute is provided based on an association grade, which reflects a degree of indirection between the primary key and a respective associated attribute in a chain of tables.

In some examples, actions (302)-(308) are performed during key handling, as described in detail herein.

A counter i is set equal to 1 (310). In some examples, the counter i is provided for looping through primary keys of the set of primary keys $\{P_1, \ldots, P_k\}$ for determining respective aggregate severity scores $V_{AGG,i}$. A counter j is set equal to 1 (312). In some examples, the counter j is provided for looping through tables of the set of tables $\{T_1, \ldots P_p\}$ for determining respective aggregate severity sub-scores $V_{AGG,i,j}$ for a primary key and table pair $\{P_i, T_j\}$. A counter g is set equal to 1 (314). In some examples, the counter g is provided for looping through primary key data, e.g., values $r_1, \ldots r_l$, of a respective primary key and table pair $\{P_i, T_j\}$ for determining respective value severity scores $V_{i,g}$ for a respective value $r_g$.

A set of relevant attributes is determined for the primary key and table pair $\{P_i, T_j\}$ (316). For example, the set of relevant attributes includes relevant attributes $\{ra_1, \ldots, ra_n\}$. In some examples, and as described in detail herein, the set of relevant attributes includes attributes of the table $T_j$ that are also in the set of associated attributes for the primary key $P_i$. That is, for example, the set of relevant attributes is provided as an intersection between the attributes of the table $T_j$ and the set of associated attributes for the primary key $P_i$. A counter q is set equal to 1 (318). In some examples, the counter q is provided for looping through relevant attributes of the set of relevant attributes to provide respective severity sub-scores $v_{i,g}$.

A number of occurrences m is determined for the value $r_g$ in the column of the relevant attribute $ra_{j,q}$ (320). For example, if the value $r_g$ occurs 25 times in the column of the relevant attribute $ra_{j,q}$, m is set equal to 25. A respective value severity sub-score $v_{i,g}$ is determined based on m and the attribute weight $aw_{j,q}$ of the relevant attribute $ra_{j,q}$ (324). For example, and as described herein, the value severity sub-score $v_{i,g}$ is determined as the product of m and the attribute weight $aw_{j,q}$. It is determined whether q is equal to n (324). That is, it is determined whether all of the relevant attributes in the set of relevant attributes have been considered. If q is not equal to n, the counter q is incremented (326), and the example process 300 loops back.

If q is equal to n, all of the relevant attributes have been considered and the value severity score $V_{i,g}$ is determined (328). In some examples, the value severity score $V_{i,g}$ is provided as the sum of all of the value severity sub-scores for the primary key $P_i$ and the value $r_g$. It is determined whether g is equal to 1 (330). That is, it is determined whether all of the values of the primary key $P_i$ have been considered. If g is not equal to 1, the counter g is incremented (332), and the example process 300 loops back. If g is equal to 1, all of the values of the primary key have been considered, and the aggregate severity sub-score $V_{AGG,i,j}$ for a primary key and table pair $\{P_i, T_j\}$ is determined (334). As described herein, the aggregate severity sub-score $V_{AGG,i,j}$ is determined as the sum of all of the value severity scores $V_{i,g}$.

It is determined whether j is equal to p (336). That is, it is determined whether all tables in the set of tables have been considered for the primary key $P_i$. If j is not equal to p, the counter j is incremented (338) and the example process loops back. If j is equal to p, the aggregate severity score $V_{AGG,i}$ for the primary key $P_i$ is determined (340). As described herein, the aggregate severity score $V_{AGG,i}$ is determined as the sum of the aggregate severity sub-scores $V_{AGG,i,j}$ for all primary key and table pairs for the a primary key $P_i$ and tables in the set of tables. It is determined whether i is equal to k (342). That is, it is determined whether an aggregate severity score has been determined for all primary keys in the set of primary keys. If i is not equal to k, the counter i is incremented (344), and the example process 300 loops back.

If i is equal to k, the aggregate severity scores are provided for all primary keys in the set of primary keys. For example, the aggregate severity scores can be displayed to a user, e.g., an administrator, in a ranked list of aggregate severity scores and respective primary keys, in which the aggregate severity score having the highest value is displayed at the top of the ranked list with the respective primary key, and the aggregate severity score having the lowest value is displayed at the bottom of the ranked list with the respective primary key. In some examples, and as described herein, data redundancy can be reduced based on the aggregate severity scores.

In some implementations, the ranked list of aggregate security scores and respective primary keys can be provided to an administrator. In some examples, the administrator can execute data reduction activities based on the information provided in the ranked list. For example, and in the example context, a table [BigOrderReporting] can be provided and can include all sales orders with total amounts >$100,000 with associated information, e.g., customer name, address, phone number. Accordingly, the structure of the table [BigOrderReporting] may have also customer attributes. In this example, a redundancy detection run can result in a relatively high value of the aggregate severity score for the primary key [Sales Order ID] in view of the table [BigOrderReporting]. This indicates, for example, that the table [BigOrderReporting] results in a server redundancy, at least with respect to the primary key [Sales Order ID]. Consequently, a redundancy reduction operation can be performed. For example, the table [BigOrderReporting] can be removed. As another example, the table [BigOrderReporting] can be modified by eliminating some attributes, e.g., customer attributes, and using one or more join operations across relevant tables. In general, implementations of the present disclosure can indicate redundancy severity at the attribute level, which enables the administrator to determine a preferred redundancy removal approach.

Figure 4:
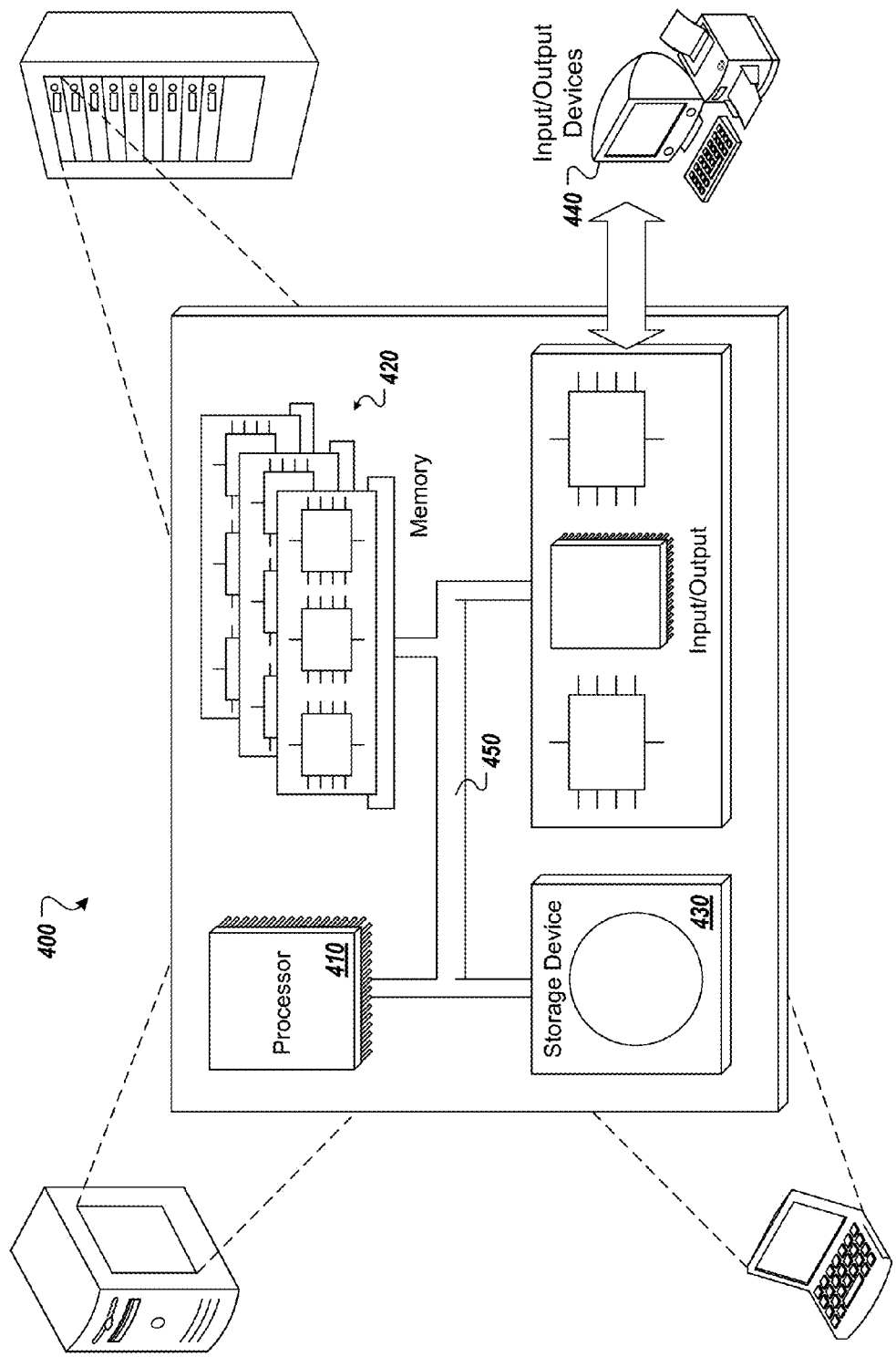
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for quantifying a redundancy of data stored in tables of a column-oriented in-memory database, the method being executed using one or more processors and comprising:
   determining, by the one or more processors, data structures for a plurality of data objects stored in the column-oriented in-memory database through an integration of distributed enterprise systems, each data structure defining one or more attributes, one attribute being a primary key of a respective data object;
   for each primary key and table pair in a set of primary key and table pairs, determining, by the one or more processors, an aggregate severity sub-score based on one or more values of the primary key in the table, the primary key being included in a set of primary keys and the table being included in a set of tables;
   determining, by the one or more processors, an aggregate severity score for each primary key in the set of primary keys based on aggregate severity sub-scores associated with the primary key to provide a plurality of aggregate severity scores, each aggregate severity score indicating a relative redundancy of values of the primary key across all tables in the set of tables and each severity sub-score being determined based on a number of occurrences of the values of the primary key across all the tables and an attribute weight that is inversely proportional to an association grade for the primary key relative to the primary table;
   providing, by the one or more processors, a list of aggregate severity scores and corresponding primary keys for display to a user; and
   performing, by the one or more processors, at least one operation to reduce the relative redundancy associated with the primary key of the set of primary keys based on the list of aggregate severity scores.

2. The method of claim 1, wherein determining an aggregate severity sub-score based on one or more values of the primary key in the table for a primary key and table pair comprises:
   determining a value severity score based on the plurality of value severity sub-scores; and
   determining the aggregate severity sub-score based on a plurality of value severity scores, the value severity score being included in the plurality of value severity scores.

3. The method of claim 2, wherein the aggregate severity sub-score is further based on a number of entries of the table of the primary key and table pair.

4. The method of claim 1, further comprising obtaining a set of associated attributes for each primary key in the set of primary keys based on a chain of tables in the set of tables, the chain of tables comprising two or more tables.

5. The method of claim 4, further comprising, for each associated attribute in the set of associated attributes, determining an attribute weight based on a degree of indirection in the chain of tables.

6. The method of claim 1, wherein the list of aggregate severity scores is provided as a ranked list of scores based on respective values of the plurality of aggregate severity scores.

7. The method of claim 1, wherein the primary key of the set of primary keys is associated with the highest aggregate severity score within the set of primary keys.

8. A non-transitory computer-readable storage medium coupled to one or more processors and having instructions stored thereon which, when executed by the one or more processors, cause the one or more processors to perform operations for quantifying a redundancy of data stored in tables of a column-oriented in-memory database, the operations comprising:
   determining data structures for a plurality of data objects stored in the column-oriented in-memory database through an integration of distributed enterprise systems, each data structure defining one or more attributes, one attribute being a primary key of a respective data object;
   for each primary key and table pair in a set of primary key and table pairs, determining an aggregate severity sub-score based on one or more values of the primary key in the table, the primary key being included in a set of primary keys and the table being included in a set of tables;
   determining an aggregate severity score for each primary key in the set of primary keys based on aggregate severity sub-scores associated with the primary key to provide a plurality of aggregate severity scores, each aggregate severity score indicating a relative redundancy of values of the primary key across all tables in the set of tables and each severity sub-score being determined based on a number of occurrences of the values of the primary key across all the tables and an attribute weight that is inversely proportional to an association grade for the primary key relative to the primary table;

providing a list of aggregate severity scores and corresponding primary keys for display to a user; and performing at least one operation to reduce the relative redundancy associated with the primary key of the set of primary keys based on the list of aggregate severity scores.

9. The computer-readable storage medium of claim 8, wherein determining an aggregate severity sub-score based on one or more values of the primary key in the table for a primary key and table pair comprises:

determining a value severity score based on the plurality of value severity sub-scores; and determining the aggregate severity sub-score based on a plurality of value severity scores, the value severity score being included in the plurality of value severity scores.

10. The computer-readable storage medium of claim 9, wherein the aggregate severity sub-score is further based on a number of entries of the table of the primary key and table pair.

11. The computer-readable storage medium of claim 8, wherein operations further comprise obtaining a set of associated attributes for each primary key in the set of primary keys based on a chain of tables in the set of tables, the chain of tables comprising two or more tables.

12. The computer-readable storage medium of claim 11, wherein operations further comprise, for each associated attribute in the set of associated attributes, determining an attribute weight based on a degree of indirection in the chain of tables.

13. The computer-readable storage medium of claim 8, wherein the list of aggregate severity scores is provided as a ranked list of scores based on respective values of the plurality of aggregate severity scores.

14. The computer-readable storage medium of claim 8, wherein operations further comprise:

receiving user input based on the list of aggregate severity scores, the user input indicating a command to execute an operation to reduce redundancy associated with a primary key of the set of primary keys; and performing the operation.

15. A system, comprising:

a computing device; and a computer-readable storage device coupled to the computing device and having instructions stored thereon which, when executed by the computing device, cause the computing device to perform operations for quantifying a redundancy of data stored in tables of a column-oriented in-memory database, the operations comprising:

determining data structures for a plurality of data objects stored in the column-oriented in-memory database through an integration of distributed enterprise systems, each data structure defining one or more attributes, one attribute being a primary key of a respective data object;

for each primary key and table pair in a set of primary key and table pairs, determining an aggregate severity sub-score based on one or more values of the primary key in the table, the primary key being included in a set of primary keys and the table being included in a set of tables;

determining an aggregate severity score for each primary key in the set of primary keys based on aggregate severity sub-scores associated with the primary key to provide a plurality of aggregate severity scores, each aggregate severity score indicating a relative redundancy of values of the primary key across all tables in the set of tables and each severity sub-score being determined based on a number of occurrences of the values of the primary key across all the tables and an attribute weight that is inversely proportional to an association grade for the primary key relative to the primary table;

providing a list of aggregate severity scores and corresponding primary keys for display to a user; and performing at least one operation to reduce the relative redundancy associated with the primary key of the set of primary keys based on the list of aggregate severity scores.

16. The system of claim 15, wherein determining an aggregate severity sub-score based on one or more values of the primary key in the table for a primary key and table pair comprises:

determining a value severity score based on the plurality of value severity sub-scores; and determining the aggregate severity sub-score based on a plurality of value severity scores, the value severity score being included in the plurality of value severity scores.

17. The system of claim 16, wherein the aggregate severity sub-score is further based on a number of entries of the table of the primary key and table pair.

18. The system of claim 15, wherein operations further comprise obtaining a set of associated attributes for each primary key in the set of primary keys based on a chain of tables in the set of tables, the chain of tables comprising two or more tables.

19. The system of claim 18, wherein operations further comprise, for each associated attribute in the set of associated attributes, determining an attribute weight based on a degree of indirection in the chain of tables.

20. The system of claim 15, wherein the list of aggregate severity scores is provided as a ranked list of scores based on respective values of the plurality of aggregate severity scores.

* * * * *